Aug. 2, 1960                R. C. NORRIE                2,947,376
           AUTOMOTIVE VEHICLE WITH TILTING OVER-ENGINE CAB
Filed Feb. 26, 1958                                6 Sheets-Sheet 3
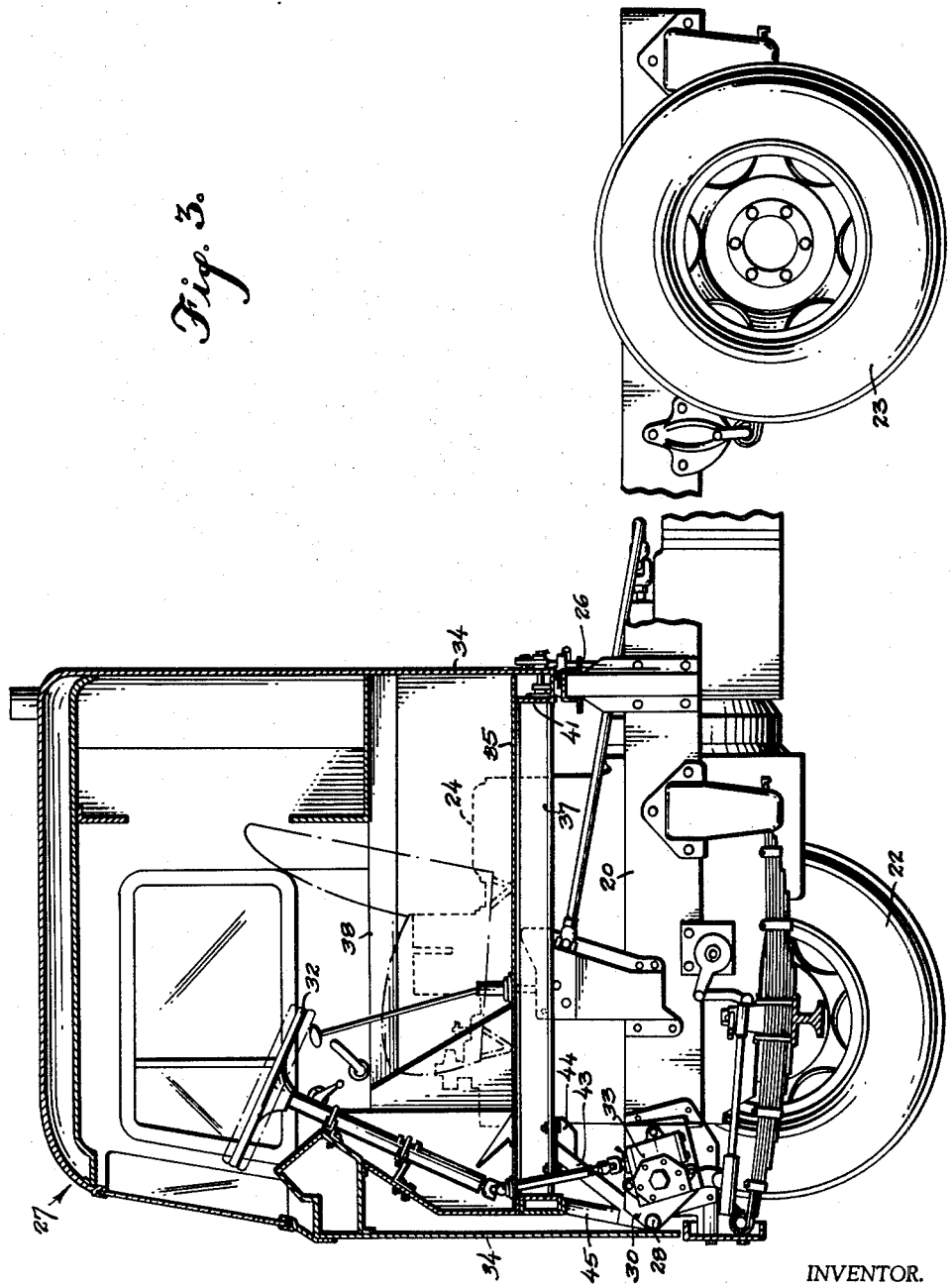
INVENTOR.
ROBERT C. NORRIE
ATTORNEYS

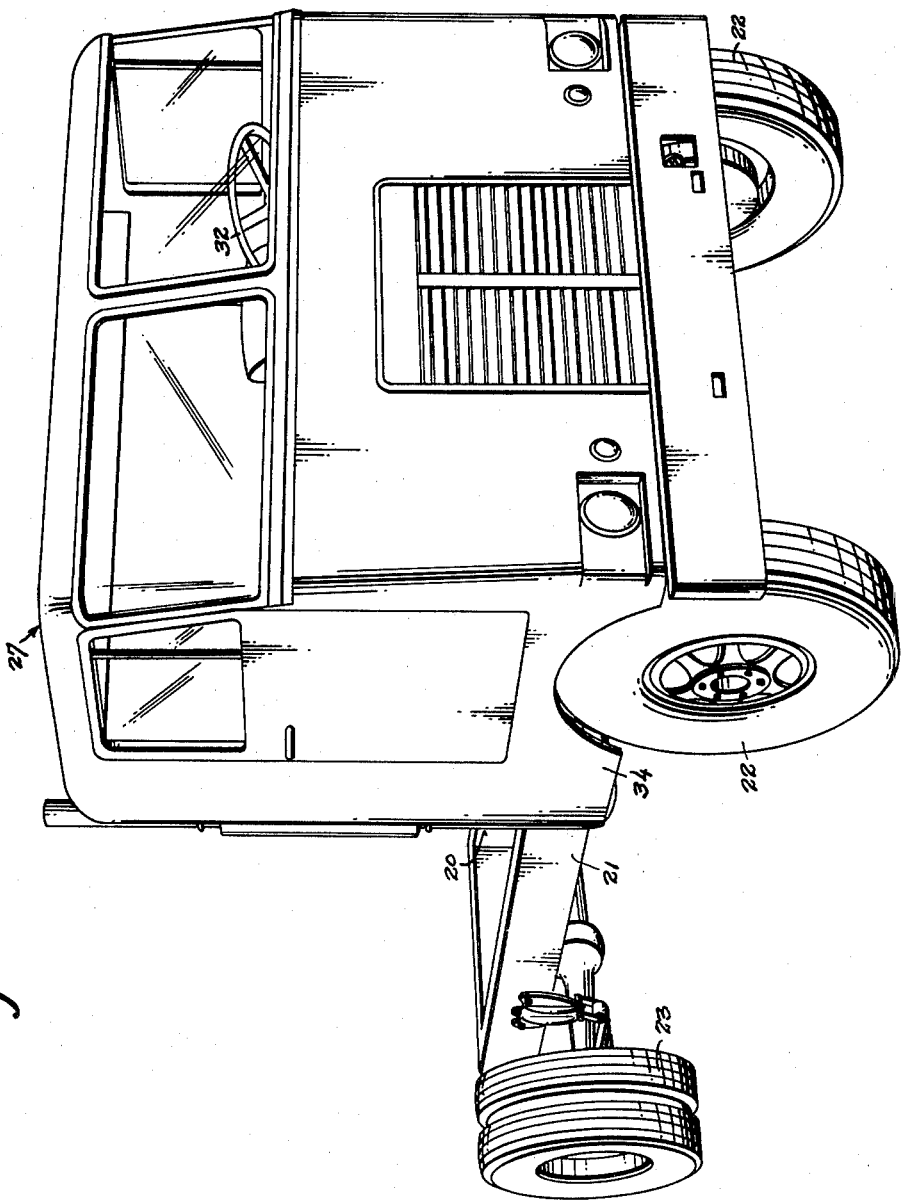

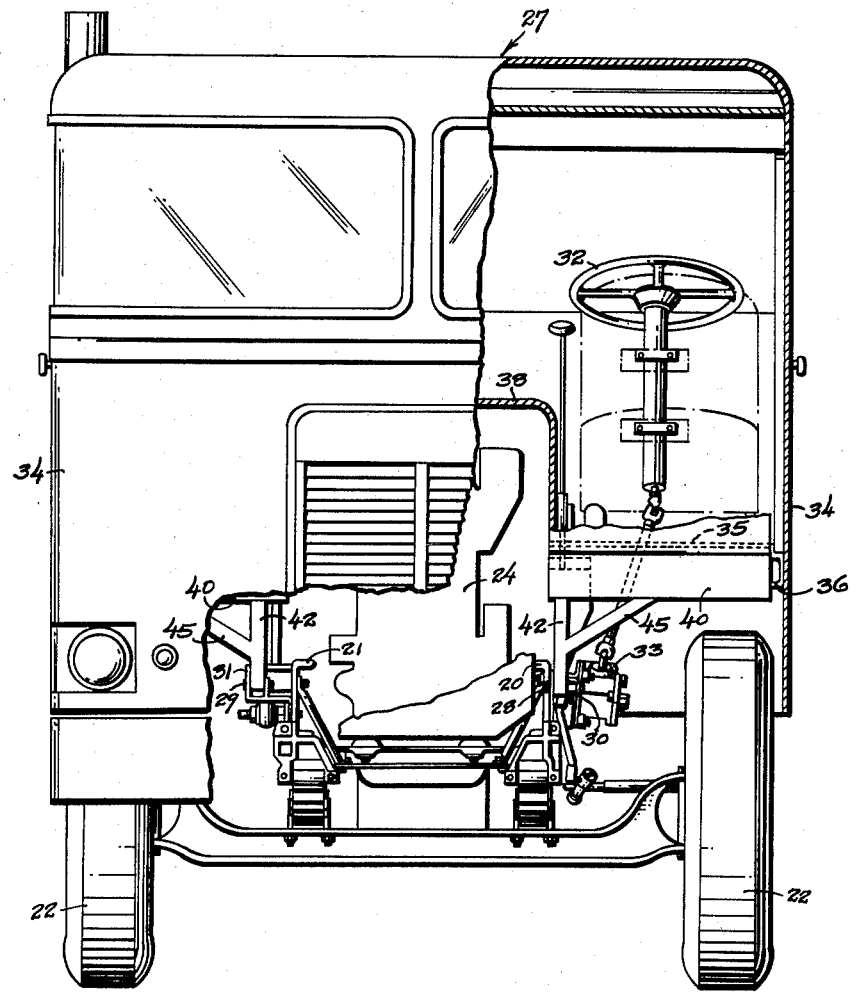

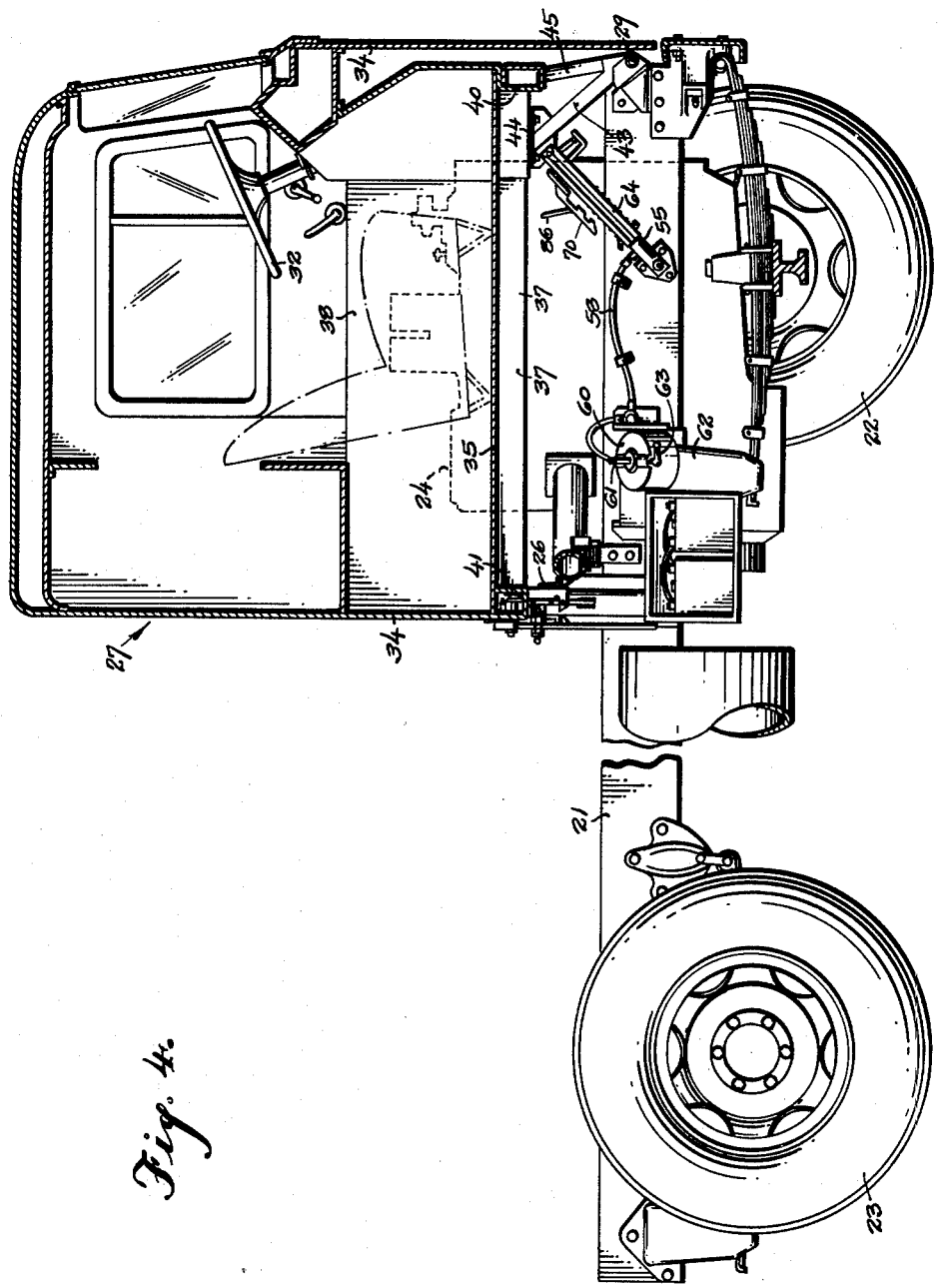

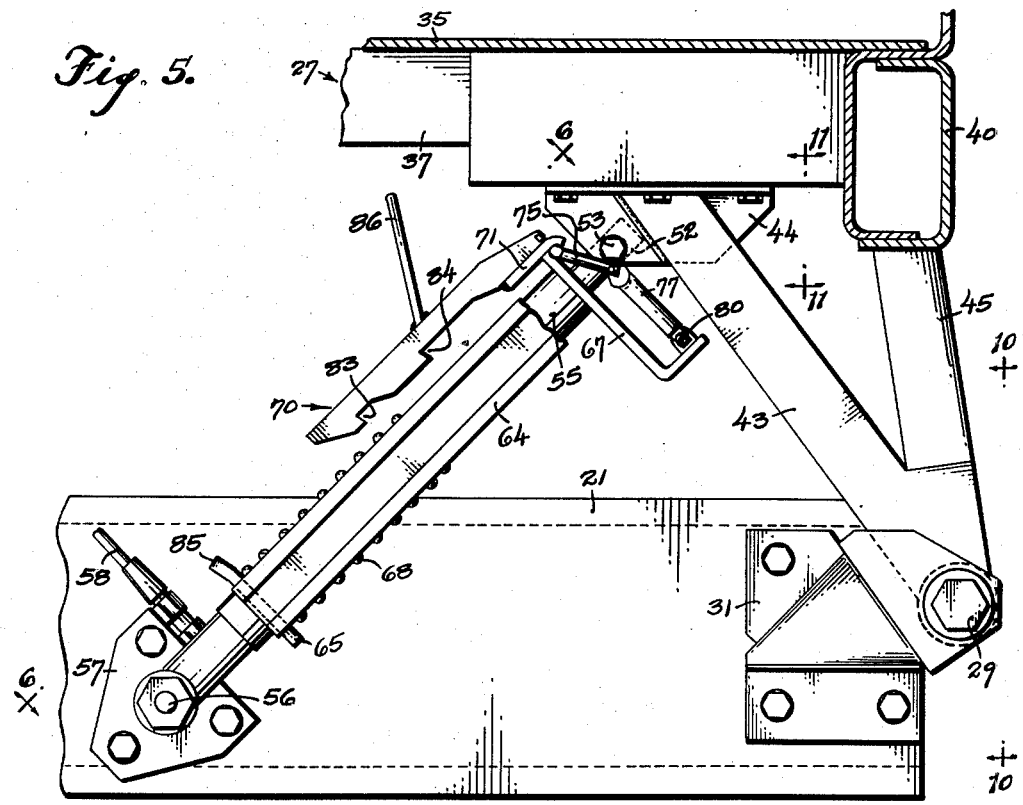
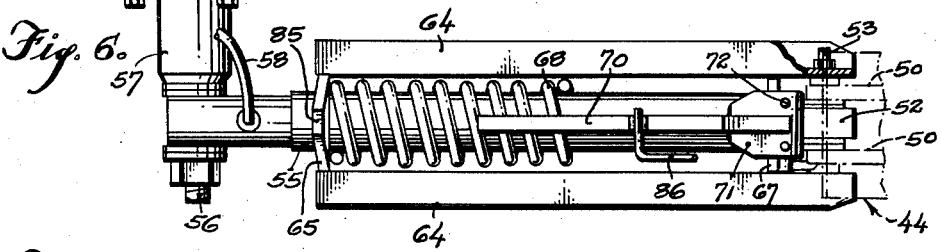
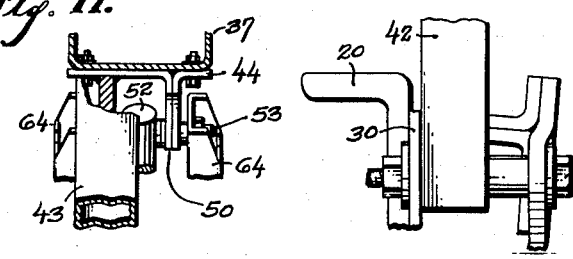

Aug. 2, 1960 R. C. NORRIE 2,947,376
AUTOMOTIVE VEHICLE WITH TILTING OVER-ENGINE CAB
Filed Feb. 26, 1958 6 Sheets-Sheet 6
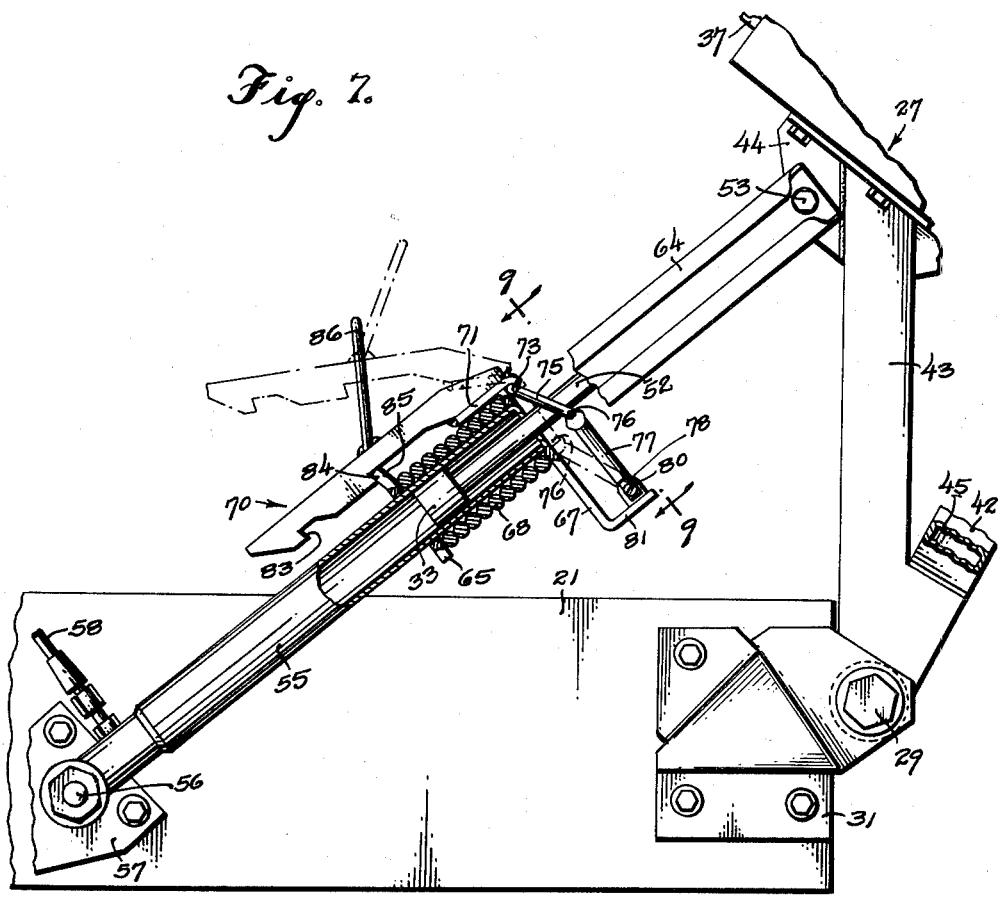
INVENTOR.
ROBERT C. NORRIE
BY
ATTORNEYS

United States Patent Office 2,947,376
Patented Aug. 2, 1960

2,947,376

AUTOMOTIVE VEHICLE WITH TILTING OVER-ENGINE CAB

Robert C. Norrie, Seattle, Wash., assignor to Pacific Car and Foundry Company, Seattle, Wash., a corporation of Washington Filed Feb. 26, 1958, Ser. No. 717,589

17 Claims. (Cl. 180—89)

This invention relates to automotive vehicles of the cab-over-engine type, and wherein, for access to the engine, the cab tilts forwardly from a normal lowered position into a raised position.

One object of the present invention is to provide a perfected tilt mounting.

Another object is to provide an improved power arrangement for tilting the cab, employing a hydraulic ram activated by a hand-operated jack-type pump so as to be entirely independent of the engine of the vehicle or of any pressure head created therefrom.

As a further object still, and giving protection against accidental descent of the raised cab, the invention aims to provide a tilting-cab vehicle having independent means to provide a tilting-cab vehicle having independent means of the hydraulic ram and releasable at will for holding the cab in a given forwardly tilted elevated position.

It is another object to so engineer said releasable holding means that the cab may be sustained selectively at either of two predetermined positions. The lower of these two positions raises the cab above the engine in a degree sufficient to expose the engine for servicing, but yet holds the floor of the cab at a sufficiently moderate slope to permit the mechanic to simultaneously service, without undue discomfort, parts of the vehicle which must be reached from within the cab.

The invention has the further object still of so devising said holding means that the same are brought into operation automatically as the cab successively reaches said predetermined levels of elevation in the course of its forward tilting motion, and additionally to provide means which permits said holding means to be inactivated at will so that the cab can lower itself by the opening of a valve permitting hydraulic fluid to bleed from the ram cylinder back to a reservoir therefor.

As a yet additional object, and one ancillary to the above, the invention aims to provide means made to operate as the cab reaches a given point in course of its lowering motion for re-setting the holding means in order that such holding means, without attention by the operator, will perform its intended function of providing an automatically engaged lock holding the cab elevated when the same is again tilted forward.

It is a still further and particular object, giving added safety against liability of accidental lowering of the cab, to provide an arrangement in which a perpendicular dropped from the cab's center of gravity, during power-operated raising of the cab, moves forwardly through and moderately beyond the axis about which the cab tilts, thus, for lowering of the cab, requiring only that moderate manual efforts be applied to nudge the cab's weight center rearwardly in the minor degree necessary to permit gravity to take over.

The invention has the still further important object of incorporating with the ram structure a normally inactive coil spring applied as a cushion bumper to limit the extension travel of the ram and its cylinder as the cab is raised, the loaded spring augmenting manual effort in initiating the return travel of the cab to a lowered position.

The above and other objects and advantages in view will appear and be understood in the course of the following description and claims, the invention consisting in the novel construction and in the adaptation and combination of parts hereinafter described and claimed.

In the accompanying drawings:

Figure 1 is a perspective view of a tilting-cab vehicle embodying teachings of the present invention.

Fig. 2 is a front elevational view thereof with parts broken away and shown in section.

Fig. 3 is a fragmentary longitudinal vertical section viewed from the left side of the vehicle and drawn on a line immediately outside the main frame of the vehicle chassis.

Fig. 4 is a fragmentary longitudinal vertical section viewed from the right side of the vehicle, the section line being here likewise located outside the main frame of the vehicle chassis.

Fig. 5 is a fragmentary longitudinal vertical sectional view drawn to an enlarged scale detailing advanced latch structure peculiar to the present invention for locking the cab in a raised position.

Fig. 6 is a fragmentary top plan view of the structure illustrated in Fig. 5, with the vantage point shown by 6—6 of Fig. 5.

Fig. 7 is a view similar to Fig. 5, partially broken away and in section, with the parts located in the positions occupied when the cab has been raised to the forward extreme of its tilting movement.

Fig. 8 is an enlarged scale fragmentary side elevational view with parts broken away and in section detailing set mechanism employed in conjunction with the advanced latch structure.

Fig. 9 is a fragmentary transverse vertical sectional view employing the same scale as Fig. 8 and drawn on line 9—9 of Fig. 7.

Fig. 10 is a fragmentary front elevational view detailing the trunnion mounting at one side of the cab.

Fig. 11 is a fragmentary transverse vertical sectional view on line 11—11 of Fig. 5; and Fig. 12 is a view similar to Fig. 10 detailing the trunnion mounting for the other side of the cab.

The automotive vehicle of the present invention is or may be conventional insofar as its chassis is concerned, and as here illustrated said chassis provides a main frame having the usual transversely spaced longitudinally extending channel principals designated by the numerals 20 and 21, with steerable road wheels 22 at the front and traction road wheels 23 at the rear. An engine 24 for the vehicle is supported between the frame principals 20 and 21 adjacent the front ends of the latter. The frame of the vehicle includes a moderately raised arch 26 extending transversely from one to the other of said principals at a point spaced somewhat to the rear of the engine. The function of this arch is to normally sustain the free rear end of a cab, denoted generally by 27, which is fulcrumed from the vehicle frame so as to tilt from a normal lowered into and out of a raised position about a transverse horizontal axis located, by preference, in substantially the same plane as the frame principals 20 and 21 and immediately to the front of the latter. Co-axial trunnion shafts 28 and 29 provide said fulcrum. Each such trunnion shaft is carried by a respective one of two brackets, as 30 and 31, bolted one to the outside face of one frame principal and the other to the outside face of the other frame principal. The left-hand or port side bracket 30, in addition to its primary function of supporting one of the two trunnion shafts, also carries the reduction-gear subassembly for a vehicle steering mechanism, and its shape (see Fig. 12) is somewhat altered from the design of the other bracket 31 in compensation of this added function. The steering arrangement, characterized in that the steering wheel 32 moves with the cab while the subassembly, or more properly the housing 33 therefor, remains fixed to the vehicle frame, is the subject matter of my co-pending application filed January 24, 1958, Ser. No. 710,894. It is important, however, to here point out, as is clearly illustrated and described in said co-pending application, that the drive between said cab-carried and frame-carried parts of the steering mechanism comprises mating stud and sleeve elements having a spline interfit. This spline connection permits endwise motion as between the parts, or complete separation should the occasion arise where it becomes desirable to tilt the cab forwardly through an approximate 180° swing as, for example, when desiring to "pull" the motor from a position directly overhead.

The over-engine cab 27, which is tilted forwardly by a hydraulic ram 33, hereinafter to be described, has the usual or a suitable shape with panels, as 34, skirting the front, back, and both sides, and having a floor 35 raised well above the lower edge of said panels. Said panels and floor derive support, in part, from a base frame which includes two outer longitudinal stringers 36 extending along the inside of the side walls, two inner longitudinal stringers 37 located one along one side and the other along the other side of a tunnel 38 which overlies the engine, two front transverse runners 40 each extending laterally from the tunnel to the concerned outer longitudinal stringer 36, and a single rear transverse runner 41 lying to the rear of the engine extending the full width of the cab.

The connection to the cab from each of the two trunnion shafts 28 and 29 comprises a respective tripodal standard invertedly mounted so that the head lies at the bottom. The trunnions are received through this head. Two of the three legs of each tripod rise from the head one to the front of the other in a respective longitudinal vertical plane. The upper end of the front said leg 42 is welded to the inner end of the concerned front frame runner 40 while the upper end of the rear said leg 43 is welded to a bracket 44 which is in turn bolted to the concerned inner stringer 37. The third leg 45 of each tripodal standard lies in the transverse vertical plane of the leg 42, extending diagonally outwardly and having its upper end welded to the concerned front frame runner 40.

Proceeding now to describe the hydraulic ram structure, and which I have here elected to illustrate as being applied to only one side of the vehicle, it will be seen (see Fig. 6) that the bracket 44 presents two pending spaced apart parallel flanges 50. A rod 52 has its upper end received between the flanges and is engaged by a traversing horizontal pivot pin 53. Upon the lower end of the rod is the ram 33 working in a cylinder 55, and such cylinder has its lower end pivotally attached, as at 56, to a bracket 57 boltably secured to one of the two longitudinal principals of the vehicle main frame. A flexible hose 58 connects the interior of the cylinder with a pressure source of hydraulic fluid. The arrangement, by preference, is one in which a jack-type pump 60 is activated by hand through operation of a reciprocally movable lever arm 61 to draw hydraulic fluid from a reservoir 62 and deliver the same through hose 58 to the cylinder 55, responsively extending the ram 33 so as to tilt the cab forwardly about the trunnion shafts as an axis. A 2-position control valve 63 is provided so that when placed in one position said pump may be activated to responsively draw oil from the reservoir and force the same into the cylinder 55 for tilting the cab and when placed in the other position the cylinder is brought into communication with the reservoir so that oil will flow back to the reservoir and allow the tilted cab to descend. The speed at which the oil returns to the reservoir is controlled by an adjustable needle valve (not shown). The control valve 63 is normally positioned so that the ram cylinder is in communication with the reservoir.

To provide structural rigidity bracing the ram-rod as the latter moves relative to the cylinder, a respective channel member, as 64, extends along each side of the rod. The upper ends of these channels swing about the pivot 53 as an axis and the lower ends are yoked by a cross-bar 65 which has a sliding fit on the cylinder. In the lowered position of the cab this yoke is spaced a substantial distance below a plate 67 which is welded to the cylinder at the head end of the latter. A compression coil spring 68 is received upon the cylinder between said yoke and plate, and has an expanded length appreciably less than the normal spacing between the two so as to be compressed by the yoke only as the latter approaches the outer extreme of the ram's extension movement. It should be here pointed out that the cab is so engineered that its weight center lies moderately to the front of the trunnion shafts 28 and 29 when the cab has been moved forwardly (see Fig. 7) to the upper extreme of its permitted tilting motion. In this position the return load imposed by the fully compressed spring is several pounds short of that required to move the cab past center. A moderate amount of manual force, augmenting such spring, is thus necessary to carry the cab over center. The accomplishment is one of providing a safety factor over and beyond that provided by a locking latch which will now be described. It will be noted that the pin 53 is removable. This accommodates the cab to the 180° forward swing hereinbefore described, the procedure being to lift the cab into the over-center position shown in Fig. 7, whereupon the load of the cab is taken by a crane, jack or other suitable device, following which the pin 53 is removed and the cab then lowered onto a block or other support to completely clear the space above the engine. It becomes a simple matter to again connect the spline drive of the steering mechanism and the pivot connection 53 when the cab is later returned to an operating position.

Normally occupying a position in overlying parallel relation to the cylinder, said locking latch is designated generally by 70 and at its upper end is pivotally connected to the cylinder's head-plate 67 for reciprocal swinging movement (see Fig. 7) out of a normal lower position shown by full lines into and from an upper position shown by dotted lines. To provide this pivotal connection a heel-plate 71 is welded to the underside of the latch and heel plate is secured by pins 72 (see Fig. 9) to a horizontal shaft 73 journaled for rocker movement in a sleeve 74 welded to the head-plate 67. A protruding end of the rock shaft carries a crank arm 75, and the free end of this crank arm is pivoted, as at 76, to the free end of a tube 77 sleeved upon a stud 78 which is in turn pivoted, as at 80, a foot-flange 81 of the head-plate 67. A compression coil spring 82 contained within the tube 77 exerts thrust from the stud against said free end of the tube. The articulating crank arm and tube produce, in effect, a toggle-mounted set lever with the articulating pivot moving past center between two extremes one of which locates the latch in the latter's said full-line lowered position and the other of which locates the latch in said dotted-line raised position.

The latch provides upon its underside two longitudinally spaced notches 83 and 84 arranged, when the latch occupies its normal lowered position, to successively hook over a catch 85 of the yoke-bar 65 as the latter travels along the length of the cylinder in the forward tilting movement of the cab. The first notch 83 automatically hooks said catch as the cab reaches approximately a three-quarter tilt. Upon forcing additional oil into the cylinder 55, catch 85, moving in unison with the ram, frees itself from said notch 83 and automatically hooks the second notch 84 as the cab reaches a full tilt. It is apparent that each said catch action holds the cab against return motion. Lifting the latch into the dotted-line position of Fig. 7, where it is yieldingly held by the toggle-mounted set lever 75—77, permits the cab to return to a normal lowered position when control valve 63 is placed in the second of its two above-named positions. It will be noted that the latch 70 carries an upstanding arm 86 welded or otherwise secured as a fixed adjunct thereto. This arm is engaged by the concerned frame stringer 37 of the lowering cab as the latter approaches the low extreme of its tilting motion and by such engagement depresses the latch in such a degree that the toggle structure 75—77 is flipped past center by its spring 82 which brings the latch into the full-line position of Fig. 7, thus automatically re-setting said latch so as to be in functioning relation to the catch 85 of the yoke-bar when the cab is again tilted forwardly.

Advanced latch structure is provided for releasably locking the cab to the arch 26 of the vehicle's main frame when the cab occupies its normal lowered position. This structure is the subject matter of a separate application for patent, Ser. No. 720,627, filed March 11, 1958.

It is thought that the invention will have been clearly understood from the foregoing detailed description of my now-preferred illustrated embodiment. When desiring to tilt the cab forwardly, the cab is disengaged from the arch 26, the directional-flow valve 63 is properly positioned, and lever 61 is reciprocally operated to pump hydraulic fluid from the reservoir into the ram cylinder 55. Should it be desired to work within the cab at the same time that the engine or other under-cab parts are being serviced, the cab is raised only until the first notch 83 of the latch engages the catch 85. At this stage of tilt, the slope within the cab is not uncomfortably steep and hence does not unduly handicap a mechanic. The cab is raised to the full tilt so as to give maximum access to the under-cab parts of the chassis when no servicing is to be performed within the cam.

It is my intention that no limitations are to be implied and that the hereto annexed claims be given the broadest interpretation to which the employed language fairly admits.

What I claim is:

1. In a tilting-cab vehicle, in combination: a vehicle main frame presenting a cross-member lying to the rear of a vehicle engine and elevated above the level occupied by transversely spaced longitudinal principals of said main frame, a cab having a frame resting by its rear end upon said cross-member and having transversely spaced apart standards, one for each side of the cab, depending as fixed adjuncts from the front end thereof, trunnions on the forward end of the main frame engaging the lower ends of the standards to support the cab for forward tilting movement about a transverse horizontal axis, latch structure releasably securing said rear end of the cab to the cross-member and power means extending between the main frame and the cab for tilting the cab, said cab presenting a tunnel upon its under side arranged to overlie said vehicle engine, the standards each comprising an invertedly mounted tripodal-like structure of which two of the legs have their upper ends secured to the underside of the cab at widely spaced point on an imagined line extending longitudinally of the cab adjacent the related side of the tunnel and the other of which three legs has its upper end secured to the underside of the cab at a point spaced laterally to the same side of said tunnel a material distance beyond said imagined line.

2. Structure according to claim 1 in which the power means comprises a hydraulic ram, said ram connecting with the cab at substantially the point at which the front one of the two first-named legs connects with the cab 3. In a tilting-cab vehicle, in combination: a vehicle main frame, a cab, trunnions on the forward end of the main frame supporting the cab for forward tilting movement about a transverse horizontal axis, a hydraulic ram connected with the main frame and with the cab, and a pump for actuating said ram, means being provided prescribing a forward extreme of tilt for the cab characteriyed in that the cab's center of gravity moves through and beyond a perpendicular raised from the tilting axis but only so far that exertion of a moderate amount of manual effort will return the point of equilibrium past center, means also being provided independent of the ram and brought into action automatically as the cab reaches at least two successive levels of elevation in course of its forward tilting motion for positively holding the cab against return motion, and means for inactivating said holding means at will, said two levels being predetermined such that the upper level steeply inclines the cab to fully expose an engine covered by the cab and the lower level exposes said engine to a lesser degree which still permits the same to be serviced and at the same time permits servicing of the interior of the cab by reducing the slop of the floor thereof to a point enabling a mechanic to work within the cab.

4. Structure according to claim 3 having a normally inactive spring loaded by the ram-activated tilting of the cab only as the cab moves to and beyond a point very near said forward extreme of its tilting movement and acting as a complement to said manual effort in returning the cab's point of equilibrium past center.

5. In a tilting-cab vehicle, in combination with spaced-apart longitudinal principals of a main frame, and a cab having spaced-apart longitudinal sills arranged to occupy a superior level spaced a substantial distance above said principals and pivotally connected to the latter for forward tilting movement of the cab, a hydraulic ram extending between said principals and sills for forwardly tilting said cab, a latch pivotally carried by one component of the hydraulic ram for swing movement into and out of an operating position and acting automatically when occupying said operating position and as the cab reaches a given point of elevation in course of its forward tilting motion for hooking a catch provided by the other component of the hydraulic ram and by said hooking action positively holding the cab against return motion, and means including an over-center throw mechanism operable manually at will for locating the latch in a position inoperative to the catch.

6. In a tilting-cab vehicle, in combination with spaced-apart longitudinal principals of a main frame, and a cab having spaced-apart longitudinal sills arranged to occupy a superior level spaced a substantial distance above said principals and pivotally connected to the latter for forward tilting movement of the cab, a hydraulic ram extending between said principals and sills for forwardly tilting said cab, a latch pivoted to one component of the hydraulic ram for rocker movement between a lowered operative position and an elevated inoperative position and when occupying said lowered position acting automatically as the cab reaches a given point of elevation in course of its forward tilting motion for hooking a catch carried by the other component of the hydraulic ram and by said hooking action positively holding the cab against return motion, a toggle-mounted set lever yieldingly influencing said latch into either a lowered or an elevated position as the lever moves beyond the toggle center in the direction concerned, the latch being lifted by hand to locate the same in said elevated position so as to permit a lowering of the cab, and means acting automatically as the cab returns to the low extreme of its tilting movement for depressing the latch to re-set the same so that the latch will automatically perform its non-return function when the cab is again tilted to said given point of elevation.

7. Structure according to claim 6 in which the latch-depressing means comprises an upstanding arm carried by the latch in a position to be engaged by the overlying sill of the cab as the cab approaches the low limit of its tilting movement.

8. The structure of claim 6 providing a pump operable by a reciprocally movable hand lever for forcing hydraulic fluid from a reservoir therefor into the cylinder for said hydraulic ram, and having a control valve movable between two positions in one of which the ram cylinder is brought into communication with the outlet side of the pump and in the other of which the ram cylinder is brought into communication with the reservoir.

9. Structure according to claim 5, the connection between the longitudinal principals of the main frame and the sills of the cab comprising, at each side of the vehicle, a tripodal standard invertedly mounted with the lower end received between a forked bracket carried at the front end of the standard and fulcrumed thereto by a traversing trunnion, the longitudinal sill being complemented at the front end of the cab by a laterally extending transverse sill, the three legs of the standard having their upper ends rigidly secured one leg to the sill structure at the substantial point of juncture between said longitudinal and transverse sill and the other legs one to the longitudinal sill and the other to the transverse sill at points spaced from said point of juncture.

10. In a tilting-cab vehicle, in combination with a vehicle main frame, and an engine supported thereby, a cab overlying said engine and pivotally connected to the frame so as to be tilted forwardly into a selected one of at least two elevated positions one lower than the other but both of which expose the engine for servicing, power-actuated means for forwardly tilting said cab, means independent of said power-actuated means for holding the cab against return movement from either of said elevated positions, and means operable at will for locating the last-named means in an inoperative set position, said two levels being predetermined such that the upper level steeply inclines the cab to fully expose an engine covered by the cab and the lower level exposes said engine to a lesser degree which still permits the same to be serviced and at the same time permits servicing of the interior of the cab by reducing the slope of the floor thereof to a point enabling a mechanic to work within the cab.

11. In a tilting-cab vehicle, in combination with a vehicle main frame, and an engine supported thereby, a cab overlying said engine and pivotally connected to the frame so as to be tilted forwardly into a selected one of at least two elevated positions one lower than the other but both of which expose the engine for servicing, hydraulic means for forwardly tilting said cab, means independent of said hydraulic means and acting automatically as the cab reaches either of said elevated positions holding the cab against return movement, a means made operable manually at will for locating the holding means in an inoperative set position to permit lowering of the cab by an operation performed at a point remote to said cab-holding means, and means acting automatically as the cab returns to the low extreme of its tilting movement for re-setting said holding means so that the same will automatically perform its non-return function when the cab is again tilted to either of said elevated positions.

12. In a tilting cab vehicle, in combination: a vehicle main frame, a cab having standards depending as fixed adjuncts from the front end thereof, and pivot connections between the forward end of the main frame and the lower ends of the standards supporting the cab for forward tilting movement about a transverse horizontal axis, a respective one of said standards being provided for each side of the cab, each of said standards comprising a respective invertedly mounted tripodal-like structure with two of the three legs thereof having their upper ends secured to the underside of the cab at points separated a substantial distance on a line which is generally longitudinal with respect to the cab located intermediate the vehicles longitudinal median line and the related outer edge of the cab and with the other of the three legs having its upper end secured to the underside of the cab at a point spaced laterally to the same side of said longitudinal median line a material distance beyond the first said line.

13. In a tilting-cab vehicle, in combination: a vehicle main frame, a cab pivotally connected to the forward end of the main frame for forward tilting movement of the cab about a transverse horizontal axis, steering mechanism for passing steering motions originating in the cab to steerable front wheels associated with the main frame and including driving and driven members one carried by the cab and the other by the main frame and separably connected by a spline interfit accommodating the two members to relative axial motion as the cab is elevated about its tilt axis, and power-actuated means extending between the cab and the frame connected by its ends thereto for tilting the cab in a predetermined limited degree relative to the frame and characterized in that at least one of said end connections, namely the connection with the cab or with the frame, includes a removable pin which, when removed, disconnects such power-actuated means from the cab or the frame, as the case may be, and acts in conjunction with the separation of said driving and driven members, which is afforded by said spline, to allow the cab to be swung forwardly beyond the limit prescribed by said power-actuated means sufficient to fully clear the space above the engine.

14. In a tilting-cab vehicle, in combination with a vehicle main frame, and a cab pivotally connected by the frame for forward tilting movement of the cab, power-actuated means for forwardly tilting said cab, means independent of said power-actuated means mounted for movement between active and inactive positions and when occupying said active position operating automatically as the cab reaches a given point of elevation in course of its forward tilting motion for positively holding the cab against return motion, means operated by hand for setting said holding means in its inactive position so that the cab may be returned to its lowered position, and means acting automatically upon said holding means in one stage of the cab's movement for re-setting the holding means in its active position, thus causing the holding means to automatically perform said non-return function when the cab is again tilted to said given point of elevation.

15. In a tilting cab vehicle, in combination: a vehicle main frame, a cab having a frame with standards depending as integral adjuncts from the front end thereof, trunnions on the forward end of the main frame engaging the lower ends of the standards to support the cab for forward tilting movement about a transverse horizontal axis, and jack means connected with the main frame and with the cab frame so as to tilt the cab forwardly by extension of the jack means, said cab frame including a pair of longitudinal sills spaced apart transversely at opposite sides of the longitudinal median line of the vehicle and a transverse sill extending laterally from said longitudinal sills at the front end thereof, one of said standards being provided for each side of the cab and comprising a respective invertedly mounted tripodal member each of which has one leg secured to the cab frame at the approximate juncture of the related longitudinal sill with the transverse sill and has the other two legs secured one to the transverse sill and the other to the longitudinal sill at points spaced from said juncture.

16. In a tilting-cab vehicle, in combination: a vehicle main frame, an over-engine cab, trunnions on the forward end of the main frame supporting the cab for forward tilting movement about a transverse horizontal axis, steering mechanism for passing steering motions originating in the cab to steerable front wheels associated with the main frame and including driving and driven members one carried by the cab and the other by the main frame and separably connected by a spline interfit accommodating the two members to relative axial motion as the cab is elevated about its tilt axis, and jack means connecting by pivot pins with the cab and with the main frame for tilting the cab in a predetermined limited degree relative to the frame so as to expose the engine for servicing and characterized in that at least one of said pivot pins is removable to act in conjunction with the separation of said driving and driven members, which is afforded by said spline, to allow the cab to be swung forwardly beyond the limit prescribed by said jack means sufficient to fully clear the space above the engine.

17. In a tilting-cab vehicle, in combination: a vehicle main frame, an over-engine cab, trunnions on the forward end of the main frame supporting the cab for forward tilting movement about a transverse horizontal axis, steering mechanism for passing steering motions originating in the cab to steerable front wheels associated with the main frame and including driving and driven members one carried by the cab and the other by the main frame and separably connected by a spline interfit accommodating the two members to relative axial motion as the cab is elevated about its tilt axis, and jack means connecting by pivot pins with the cab and with the main frame for tilting the cab relative to the frame, said jack means prescribing a forward extreme of tilt for the cab characterized in that the cab's center of gravity moves through and beyond a perpendicular raised from the tilting axis but only so far that exertion of a moderate amount of manual effort will return the point of equilibrium past center, at least one of said pivot pins being removable to act in conjunction with the separation of said driving and driven members afforded by said spline connection to allow the cab to be swung forwardly beyond the limit prescribed by said jack means in a degree sufficient to fully clear the space above the engine.

References Cited in the file of this patent

UNITED STATES PATENTS

| | | |
|---|---|---|
| 1,085,964 | Briggs | Feb. 3, 1914 |
| 2,210,519 | Wollensak | Aug. 6, 1940 |
| 2,244,801 | Peterson | June 10, 1941 |
| 2,549,266 | Troden et al. | Apr. 17, 1951 |
| 2,740,487 | Murty et al. | Apr. 3, 1956 |
| 2,798,568 | Zeller | July 9, 1957 |
| 2,838,126 | Gleasman | June 10, 1958 |
| 2,864,121 | Imber et al. | Dec. 16, 1958 |